(12) United States Patent
Troyanowski

(10) Patent No.: US 8,666,864 B2
(45) Date of Patent: Mar. 4, 2014

(54) COMPUTERIZED METHOD FOR AUTOMATED FOREIGN EXCHANGE MARKET TRANSACTIONS

(76) Inventor: Gregg Troyanowski, Pompano Beach, FL (US)

( * ) Notice: Subject to any disclaimer, the term of this patent is extended or adjusted under 35 U.S.C. 154(b) by 0 days.

(21) Appl. No.: 13/556,924

(22) Filed: Jul. 24, 2012

(65) Prior Publication Data

US 2013/0290157 A1    Oct. 31, 2013

Related U.S. Application Data

(60) Provisional application No. 61/640,164, filed on Apr. 30, 2012.

(51) Int. Cl.
*G06Q 40/00*    (2012.01)
(52) U.S. Cl.
USPC .............................................. 705/35; 705/37
(58) Field of Classification Search
USPC .......................................................... 705/35
See application file for complete search history.

(56) References Cited

U.S. PATENT DOCUMENTS

| | | | |
|---|---|---|---|
| 2002/0087455 A1* | 7/2002 | Tsagarakis et al. | 705/37 |
| 2005/0283422 A1* | 12/2005 | Myr | 705/37 |
| 2007/0067233 A1* | 3/2007 | Dalal | 705/37 |
| 2008/0027850 A1* | 1/2008 | Brittan et al. | 705/37 |
| 2013/0024349 A1* | 1/2013 | Venkatesan et al. | 705/37 |

* cited by examiner

*Primary Examiner* — Bruce I Ebersman
*Assistant Examiner* — John Anderson

(57) ABSTRACT

The present invention is an automated proprietary application that provides a user with trade parameters to allow new trades to be opened and closed, and also provides an operating schedule that such new trades are to be initiated. Both the trade parameters and the operating schedule are entirely user defined. The present invention acquires data from a market information database in order to calculate market derived trending signals. These market derived trending signals determine if the user's defined trade parameters have been fulfilled. The user creates the operating schedule to designate the times and dates at which a new trade could be opened. These trades are unable to be opened if every trade parameter has not been fulfilled. The present invention can execute direct trades, reverse trades, or perform no trades in which these trade actions are determined by the trend of a selected currency pair.

10 Claims, No Drawings

COMPUTERIZED METHOD FOR AUTOMATED FOREIGN EXCHANGE MARKET TRANSACTIONS

The current application claims a priority to the U.S. Provisional Patent application Ser. No. 61/640,164 filed on Apr. 30, 2012.

FIELD OF THE INVENTION

The present invention generally relates to a computerized method for initiating foreign exchange transactions. More particularly, the present invention is a computerized method that utilizes trending signal values and users defined parameters to initiate electronic exchanges of foreign and domestic currencies.

BACKGROUND OF THE INVENTION

The foreign exchange market is a form of exchange for global decentralized trading of foreign currency. Buyers and sellers are able to conduct trades from around the world, and keep the market open from 20:15 GMT Sunday to 22:00 GMT Friday. It is the most liquid financial market in the world whose traders include large banks, central banks, institutional investors, currency speculators, corporations, governments, other financial institutions, and retail investors. It is estimated that the average daily turnover in global foreign currency is in excess of 4 Trillion USD. With such large trade volumes and near continuous hours of operation, the foreign exchange market offers investors a unique market environment to enhance profit margins and increase their return on investment.

There are several well known methods in existence that facilitates a user's ability to conduct trades in the foreign exchange market. Unfortunately, many of the methods available to investors require them to be constantly vigilant of market conditions to initiate trade arrangements. With the markets near continuous hours off operation, users are unable to control their trades at all times.

Thus, it is the object of this invention to present a method that utilizes an automated system that facilitates foreign exchange currency transactions for a user, by using user established trade parameters for particular time instances throughout the foreign exchange markets hours of operation.

DETAIL DESCRIPTIONS OF THE INVENTION

All illustrations of the drawings are for the purpose of describing selected versions of the present invention and are not intended to limit the scope of the present invention.

The present invention is an automated system that facilitates foreign exchange currency transactions to a user through the user's preferred centralized clearing mechanism—broker's trading station. In the preferred embodiment of the present invention, this automated system operates as a software-controlled computer application that displays prompts to the user through a graphic user interface and can acquire current market data from the foreign exchange market. The current market data is acquired through a network connection with a market information database. However, the present invention should not be limited to a software-controlled computer application and could be integrated into any type of electronic communication device. The present invention utilizes price movement of currency pairs using market derived trending signals and user defined trading parameters in order to initiate or execute trades and actions. The user can create an operating schedule so that these trades and actions can be initiated or executed at specified instances of time or at specified frequency intervals. The user defined trading parameters must be met or exceeded if the trades or actions are to be initiated or executed at the specified instances of time or the specified frequency intervals.

The software-controlled processes of present invention are described as a method. The method is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The user should initially select the currency pair that is to be traded. A set of trading parameters and an operating schedule can be assigned to dissimilar currency pairs. This provides a user with a dynamic proprietary trading application. Once the currency pair has been selected, the user should then either set up the user defined trading parameters or create the operating schedule. The user should set up the trading parameters by inputting or selecting the parameters to establish conditions that trade actions would be initiated. The user should create the operating schedule by defining the time and date that trade actions would occur during the foreign exchange markets operating times. With the trading parameters set and the operating schedule created, the user should then assign trade actions to each specified instance of time or each specified frequency interval within the operating schedule in order to define the manner in which the selected currency pair is to be traded. Trading should begin only after the user has been prompted to execute their trading strategy. The trading strategy is defined as the overall combination of the user's created operating schedule, assigned trade actions, and the selected or inputted trading parameters. Multiple trading strategies could be formulated for different times of the year, or to account for fluctuations in the foreign exchange market, for example.

Since the foreign exchange market allows continual trading between 20:15 GMT Sunday and 22:00 GMT Friday, the user can designate a plurality of operating times that trades and actions would only be able to be executed or initiated. Each of the plurality of operating times includes a start time and date and an end time and date. For example, the user could select two operating times—one with a start time and date at 12:00 GMT Monday and an end time and date at 16:00 GMT Monday, and another with a start time and date at 8:00 GMT Wednesday and an end time and date at 16:00 GMT Friday. The user can also input a time interval setting that designates the frequency at which the trades or actions would be executed or initiated. Each operating time is equally separated into operating intervals by the time interval setting. For example, a user could input a time interval setting of five minutes so that within the operating time between 12:00 GMT Monday and 16:00 GMT Monday, a trade or action could only be executed or initiated at every five minute interval—the first operating interval would begin at 12:00 GMT Monday and end at 12:05 Monday.

The operating schedule should be able to be formatted to the user's specifications. The present invention provides a plurality of trade actions that are to be assigned to each operating interval. Each assigned trade action should only be executed if the entirety of the user's defined trading parameters is fulfilled. The plurality of trade actions should include a direct trade, a reverse trade, and a no trade performed. The type of trade action determines if the present invention executes a buy command or a sell command. This is determined by the direction of the trending price of the selected currency pair. Essentially, currency is either bought or sold if the buy command or sell command was executed. If the price of the selected currency pair has been increasing, or has increased within the current operating interval, then the trending price of the currency pair is trending up. Conversely, if the price of the selected currency pair has been decreasing, or has decreased within the current operating interval, then the price of the currency pair is trending down. A direct trade is executed in the direction that the price of the selected currency pair is trending. A direct trade should initiate a buy command if the price of the selected currency pair is trending up. However, if the price of the selected currency pair is trending down, a direct trade would initiate a sell command. The reverse trade functions oppositely to the direct trade. A reverse trade is executed in the reverse direction that the price of the selected currency pair is trending. A reverse trade should initiate a buy command if the price of the selected currency pair is trending down. Whereas, the reverse trade would initiate a sell command if the price of the selected currency pair is trending up. Assigning a trade action of no trade performed to an operating interval essentially means that neither a buy command nor a sell command will be executed. Price fluctuations that are bounded by local minimum and maximum price values for a particular operating interval are referred to as the range trend. This means that the direction of the selected currency pair is neither trending up nor trending down.

The present invention implements three market derived trending signals in determining the trade actions. These market derived trending signals are historical price trends that are used to interpret possible price trends and price direction. The three trending signals that are utilized by the method are a rate of change (ROC) signal, a relative strength index (RSI) signal, and a proprietary signal (FA21 signal); however, the present invention should not be limited by only three market derived trending signals and other various market derived trending signals could be implemented to more accurately determine the trade actions. Information is acquired from the market information database in order to determine each of the market derived trending signals. Both the RSI signal and the ROC signal are royalty free public signals that are made available through a clearing mechanism, or trading station, which is the preferred embodiment of the market information database. The market derived trending signals can be stored within an event log.

The FA21 is a momentum oscillator that uses a proprietary methodology to derive a value calculated from a number of non-disclosed market derived trending signals. In the preferred embodiment of the present invention, the FA21 signal uses twenty-one market trend values, calculated at the beginning of the operating interval in which a signal value of −21 to +21 is assigned to FA21 signal. However, dissimilar signal values could be assigned to the FA21 signal.

The ROC signal, as utilized by the present invention in its preferred embodiment, is a momentum oscillator that measures the percent change of currency pair prices. The ROC signal can be calculated across multiple operating intervals or within each operating interval. Information is retrieved about the currency pair price from the market information database. In order to determine and calculate the ROC signal, an initial currency pair price is acquired from the market information database that corresponds to an operating interval start time. Also, a final currency pair price is acquired from the market information database that corresponds to an operating interval end time. The ROC signal is then calculated as the change in currency pair price over the operating interval, divided by the initial currency pair price, and then multiplied by one hundred. The ROC signal can be either positive or negative, which depends on the trend of the currency pair.

The RSI signal is another momentum oscillator that measures the speed and change of price movements. In order to calculate the RSI signal, the relative strength of the currency pair of an operating interval must be determined. The relative strength is determined by first acquiring the average currency pair gain across an operating interval and also the average currency pair loss across the same operating interval. The relative strength is essentially the ratio of average currency pair loss to average currency pair gain. The relative strength signal is calculated from the relative strength by dividing one hundred by the relative strength plus one, and then subtracting the resulting value from one hundred. Either a relative strength buy signal value or a relative strength sell signal value can be determined from the relative strength. The difference between the relative strength buy signal and the relative strength sell signal value is that the ratio of the average currency pair loss and the average currency pair gain is inverted. In the preferred embodiment of the present invention, the RSI signal is calculated across fourteen consecutive operating intervals.

The present invention provides a plurality of trade parameters. The plurality of trade parameters includes strategic direct trade parameters, strategic reverse trade parameters, exit direct trade parameters, exit reverse trade parameters, composite selector parameters, price parameters, basic trading parameters, and percent allocation management module (PAMM) settings. Each of these trade parameters can have a subset of additional trade parameters. Additional trade parameters can be provided to increase the dynamic nature of the user's overall trading strategy.

The strategic direct trade parameters and the strategic reverse trade parameters function to open a new trade according to the composite selector parameters, price parameters, basic trade parameters, and PAMM settings. In order to close this opened new trade, the exit direct trade parameters and the exit reverse trade parameters must be fulfilled. This allows trading to be controlled extensively by the user's defined trading parameters.

The strategic direct trade parameters includes a direct proprietary signal value, a direct rate of change signal value, a direct relative strength index buy signal value, and a direct relative strength index value. The strategic direct trade parameters are the parameters in which a direct trade is to be executed if it is assigned to an operating interval. The signal values of FA21 signal, the ROC signal, and the RSI signal are compared to the values of the user's inputted signal values. If each of the strategic direct trade parameters are fulfilled or exceeded, along with the remainder of the trade parameters, then a direct trade should be executed.

The strategic reverse trade parameters includes a reverse proprietary signal value, a reverse rate of change signal value, a reverse relative strength index buy signal value, and a reverse relative strength index value. In contrary to the strategic direct trade parameters, the strategic reverse trade parameters are the parameters in which a reverse trade is to be executed if it is assigned to an operating interval. The signal values of FA21 signal, the ROC signal, and the RSI signal are compared to the values of the user's inputted signal values. If each of the strategic reverse trade parameters are fulfilled or exceeded, along with the remainder of the trade parameters, then a reverse trade should be executed.

The composite selector parameters can include a global inverse indicator, a global period, and ignore last period. The price parameters can include a TF parameter and a bid or ask parameter.

The basic trade parameters can include an allow strategy to trade parameter, an account to trade on parameter, a trade amount in lots parameter, and a schedule file insert prompt. The basic trade parameter provides the present invention with the account to initiate or execute trades through and the amount of currency to trade, in lots. Also, the user can designate the operating schedule of the current overall trading strategy within the basic trade parameters.

The exit direct trade parameters can include a direct set limit orders parameter, a direct limit order in pips parameter, a direct set take profit time limit parameter, a direct take profit limit parameter, and a direct minimum take profit parameter. The user defines these parameters in order to close a direct trade.

The exit reverse trade parameters can include a reverse set limit orders parameter, a reverse limit order in pips parameter, a reverse set take profit time limit parameter, a reverse take profit limit parameter, and a reverse minimum take profit parameter. The user defines these parameters in order to close a reverse trade.

The PAMM settings can include a PAMM enabled setting, a margin requirement setting, and a PAMM percentage setting. The user can control their PAMM through these settings.

The user formulates the overall trading strategy by inputting each of the plurality of trade parameters, creating an operating schedule, and assigning a trade action to each operating interval. The present invention should be capable of uploading standard trading strategies. These standard trading strategies would automatically input values or set up the trading parameters, operating schedule, and/or assign the trade actions. This would be beneficial to a user if the user has multiple formulated trading strategies for different times of the month or year. Also, the user should be able to change the parameters and trade actions assigned during the foreign exchange markets operating week. If the user's selected currency pair is beginning to trend in an unexpected direction or very rapidly in a particular direction, as examples, then altering the parameters to account for these unexpected changes would be desirable.

Although the invention has been explained in relation to its preferred embodiment, it is to be understood that many other possible modifications and variations can be made without departing from the spirit and scope of the invention as hereinafter claimed.

What is claimed is:

1. A non-transitory computer-readable medium that stores instructions executable by one or more processors to perform a method for automating foreign exchange market transactions, comprising
    instructions for providing a market information database, wherein the market information database includes currency pair price data, currency pair gain data, currency pair loss data;
    instructions for providing a plurality of trade parameters, wherein the plurality of trade parameters includes strategic direct trade parameters, strategic reverse trade parameters, exit direct trade parameters, exit reverse trade parameters, composite selector parameters, price parameters, basic trading parameters, and percent allocation management module (PAMM) settings;
    instructions for providing a trading schedule, wherein the trading schedule includes a plurality of operating dates, a plurality of operating times, and a time interval setting;
    instructions for providing a plurality of trade actions, wherein the plurality of trade actions includes a direct trade, a reverse trade, and no trade performed;
    instructions for calculating a plurality of market derived trending signals, wherein the plurality of market derived trading signals includes a rate of change signal, a relative strength index signal, and a proprietary signal;
    instructions for prompting to form a operating schedule from the trading schedule by creating a plurality of operating times, wherein the operating schedule includes at least one selected start time and date, at least one selected end time and date, and a selected time interval;
    instructions for equally separating each of the plurality of operating times into a plurality of operating intervals, wherein an operating interval includes an operating interval start time and an operating interval end time;
    instructions for prompting to select each of the plurality of trade parameters in order to execute an assigned trade action during the operating schedule;
    instructions for determining if each selected trade parameter is fulfilled or not fulfilled through the network connection with the market information database; and
    instructions for executing a buy command or a sell command to the assigned action by determining if the plurality of market derived trending signals are trending up or trending down;
    instructions for prompting to assign the direct trade, the reverse trade, or no trade performed to each operating interval;
    instructions for executing the direct trade if the direct trade is assigned to the operating interval and each selected trade parameter is fulfilled, or
    instructions for executing the reverse trade if the reverse trade is assigned to the operating interval and each selected trade parameter is fulfilled, or
    instructions for executing no trade if no trade performed is assigned to the operating interval;
    instructions for acquiring an initial currency pair price from the market information database corresponding to the operating interval start time;
    instructions for acquiring a final currency pair price from the market information database corresponding to the operating interval end time;
    instructions for calculating the rate of change signal from the initial currency pair price and the final currency pair price, wherein
    the composite selector parameters includes a global inverse indicator, a global period, and ignore last period, the price parameters includes a TF parameter, and a bid or ask parameter, the PAMM settings includes a PAMM enabled setting, a margin requirement setting and a PAMM percentage setting, and the basic trade parameters includes an allow strategy to trade parameter, an account to trade on parameter, a trade amount in lots parameter, and a schedule file insert prompt.

2. The non-transitory computer-readable medium that stores instructions executable by one or more processors to perform the method for automating foreign exchange market transactions of claim 1, comprising
    instructions for receiving each selected start time and date;
    instructions for receiving each selected end time and date;
    instructions for receiving the selected time interval; and
    instructions for recognizing each selected start time and selected end time as the operating time; and
    instructions for equally separating the operating time into the plurality of operating intervals by the selected time interval, wherein the operating time is divided by the selected time interval.

3. The non-transitory computer-readable medium that stores instructions executable by one or more processors to perform the method for automating foreign exchange market transactions of claim 1, comprising
- instructions for determining an average currency pair gain from the market information database corresponding to each operating interval;
- instructions for determining an average currency pair loss from the market information database corresponding to each operating interval;
- instructions for calculating relative strength from the average currency pair gain and the average currency pair loss; and
- instructions for calculating the relative strength index signal from the relative strength.

4. The non-transitory computer-readable medium that stores instructions executable by one or more processors to perform the method for automating foreign exchange market transactions of claim 1, comprising
- instructions for calculating the proprietary signal at the beginning of each of the plurality of operating intervals from the market information database and software inputted market trend data.

5. The non-transitory computer-readable medium that stores instructions executable by one or more processors to perform the method for automating foreign exchange market transactions of claim 1, comprising
- instructions for prompting to input the strategic direct trade parameters, wherein the strategic direct trade parameters includes a direct proprietary signal value, a direct rate of change signal value, a direct relative strength index buy signal value, and a direct relative strength index value;
- instructions for comparing the proprietary signal to an inputted direct proprietary signal value;
- instructions for comparing the rate of change signal to an inputted direct rate of change signal value;
- instructions for comparing the relative strength index signal to an inputted direct relative strength index buy signal value; and
- instructions for comparing the relative strength index signal to an inputted direct relative strength index sell signal value.

6. The non-transitory computer-readable medium that stores instructions executable by one or more processors to perform the method for automating foreign exchange market transactions of claim 1, comprising
- instructions for prompting to input the strategic reverse trade parameters, wherein the strategic reverse trade parameters includes a reverse proprietary signal value, a reverse rate of change signal value, a reverse relative strength index buy signal value, and a reverse relative strength index value;
- instructions for comparing the proprietary signal to an inputted reverse proprietary signal value;
- instructions for comparing the rate of change signal to an inputted reverse rate of change signal value;
- instructions for comparing the relative strength index signal to an inputted reverse relative strength index buy signal value; and
- instructions for comparing the relative strength index signal to an inputted reverse relative strength index sell signal value.

7. The non-transitory computer-readable medium that stores instructions executable by one or more processors to perform the method for automating foreign exchange market transactions of claim 1, wherein the exit direct trade parameters includes a direct set limit orders parameter, a direct limit order in pips parameter, a direct set take profit time limit parameter, a direct take profit limit parameter, and a direct minimum take profit parameter.

8. The non-transitory computer-readable medium that stores instructions executable by one or more processors to perform the method for automating foreign exchange market transactions of claim 1, wherein the exit reverse trade parameters includes a reverse set limit orders parameter, a reverse limit order in pips parameter, a reverse set take profit time limit parameter, a reverse take profit limit parameter, and a reverse minimum take profit parameter.

9. The non-transitory computer-readable medium that stores instructions executable by one or more processors to perform the method for automating foreign exchange market transactions of claim 1, comprising
- instructions for executing the buy command if the plurality of market derived trending signals are trending up and the assigned trade action is the direct trade; and
- instructions for executing the sell command if the plurality of market derived trending signals are trending down and the assigned trade action is the direct trade.

10. The non-transitory computer-readable medium that stores instructions executable by one or more processors to perform the method for automating foreign exchange market transactions of claim 1, comprising
- instructions for executing the buy command if the plurality of market derived trending signals are trending down and the assigned trade action is the reverse trade; and
- instructions for executing the sell command if the plurality market derived trending signals are trending up and the assigned trade action is the reverse trade.

* * * * *